(12) United States Patent
Chisholm et al.

(10) Patent No.: US 8,374,766 B2
(45) Date of Patent: Feb. 12, 2013

(54) POWER MANAGEMENT SYSTEM FOR COMPACTION VEHICLES AND METHOD

(75) Inventors: Matthew Chisholm, Minneapolis, MN (US); Stephen Nelson, Andover, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 1016 days.

(21) Appl. No.: 11/947,426

(22) Filed: Nov. 29, 2007

(65) Prior Publication Data

US 2009/0143952 A1 Jun. 4, 2009

(51) Int. Cl.
*G06G 7/70* (2006.01)
(52) U.S. Cl. .......................................................... 701/99
(58) Field of Classification Search .................. 701/50,
701/54, 99–115; 60/420, 431, 445, 448,
60/449; 180/305–308, 900; 123/319, 339.1,
123/339.14, 339.16, 339.19, 349, 395, 399
See application file for complete search history.

(56) References Cited

U.S. PATENT DOCUMENTS

| | | | | |
|---|---|---|---|---|
| 3,741,669 A | * | 6/1973 | Harris | 404/117 |
| 4,139,987 A | | 2/1979 | Budzich | |
| 4,208,895 A | | 6/1980 | Grigorenko et al. | |
| 4,240,515 A | | 12/1980 | Kirkwood | |
| 4,606,313 A | * | 8/1986 | Izumi et al. | 123/386 |
| 4,644,748 A | | 2/1987 | Goss, Jr. et al. | |
| 4,655,689 A | | 4/1987 | Westveer et al. | |
| 4,773,369 A | * | 9/1988 | Kobayashi et al. | 123/357 |
| 5,077,973 A | * | 1/1992 | Suzuki et al. | 60/428 |
| 5,155,996 A | * | 10/1992 | Tatsumi et al. | 60/431 |
| 5,214,916 A | * | 6/1993 | Lukich | 60/431 |
| 5,468,126 A | * | 11/1995 | Lukich | 417/53 |
| 5,469,646 A | * | 11/1995 | Takamura | 60/428 |
| 5,474,147 A | | 12/1995 | Yesel et al. | |
| 5,481,875 A | | 1/1996 | Takamura et al. | |
| 5,525,043 A | * | 6/1996 | Lukich | 417/218 |
| 5,552,640 A | * | 9/1996 | Sutton et al. | 290/40 B |
| 5,720,358 A | * | 2/1998 | Christensen et al. | 180/53.4 |
| 5,930,996 A | * | 8/1999 | Nakamura et al. | 60/426 |
| 5,967,756 A | * | 10/1999 | Devier et al. | 417/18 |
| 6,021,756 A | * | 2/2000 | Nakamura | 123/385 |
| 6,094,617 A | * | 7/2000 | Lapke | 701/104 |
| 6,234,254 B1 | * | 5/2001 | Dietz et al. | 172/3 |
| 6,314,727 B1 | * | 11/2001 | Prabhu et al. | 60/431 |
| 6,347,517 B1 | | 2/2002 | Sereni | |
| 6,427,107 B1 | * | 7/2002 | Chiu et al. | 701/50 |
| 6,535,807 B2 | * | 3/2003 | Christensen et al. | 701/50 |
| 6,772,060 B2 | * | 8/2004 | McCauley et al. | 701/104 |
| 6,842,689 B2 | * | 1/2005 | Andres et al. | 701/110 |
| 6,920,387 B2 | * | 7/2005 | Landes et al. | 701/102 |
| 6,922,990 B2 | | 8/2005 | Naruse et al. | |
| 6,941,688 B2 | * | 9/2005 | Ichimura et al. | 37/348 |
| 7,276,815 B2 | * | 10/2007 | Algrain et al. | 307/80 |
| 7,398,147 B2 | * | 7/2008 | Kozarekar et al. | 701/101 |
| 7,469,534 B2 | * | 12/2008 | Nishi et al. | 60/428 |
| 2006/0108475 A1 | | 5/2006 | Bartov | |
| 2006/0191732 A1 | * | 8/2006 | Lunzman et al. | 180/307 |

\* cited by examiner

*Primary Examiner* — Russell Frejd
(74) *Attorney, Agent, or Firm* — Leydig, Voit & Mayer

(57) ABSTRACT

A method for managing power in a hydrostatically driven vehicle includes calculating the power consumption of the vehicle based on the pressure of the compressed fluid in a hydraulic circuit, and the displacement of the pump. An electronic controller further calculates the power output of the engine based on at least one engine operating parameter, and operates to change the power output of the engine based on a difference between the power consumption and the power output.

19 Claims, 5 Drawing Sheets

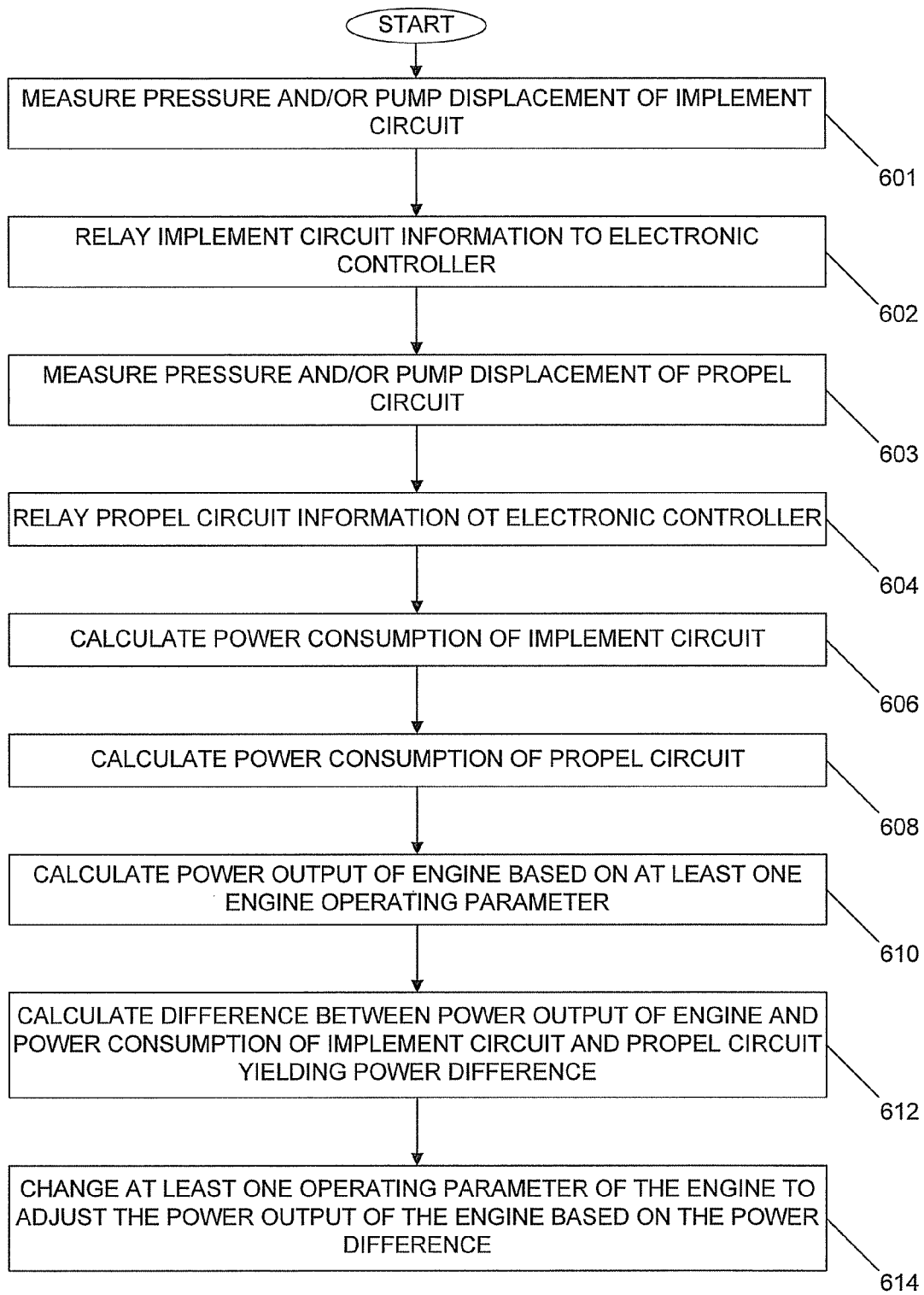

POWER MANAGEMENT SYSTEM FOR COMPACTION VEHICLES AND METHOD

TECHNICAL FIELD

This patent disclosure relates generally to hydrostatically driven vehicles and, more particularly, to control strategies for managing power generation by engines associated with such vehicles.

BACKGROUND

A typical hydrostatically driven vehicle includes an engine having an output shaft connected to one or more fluid pumps. A variable displacement fluid pump is connected to the engine through a transmission and varies its displacement to accommodate power demands of various vehicle systems. The fluid pump or pumps associated with the vehicle is connected via fluid pressure lines to various actuators and hydraulic motors around the vehicle. For example, a vehicle may have one or more hydraulic propel motors that rotate the drive wheels or rollers and move the vehicle along a base surface. Further, the vehicle may have one or more implements performing various functions. In the case of a soil compactor, an implement may be a vibrator device included within a compacting drum of the vehicle. The vibrator may operate to impart compacting energy to the base surface, thus increasing the efficiency of compaction. The vibrator and other types of rotary hydraulic actuators are powered by a pressurized flow of fluid from the pump. The speed, torque output, and power consumption of these motors are proportional to the flow rate and pressure of the hydraulic fluid passing through them.

An engine on a hydrostatically driven vehicle often typically operates in a continuous fashion at a constant speed and fueling command or, stated differently, at a constant power output. Even though the power output of the engine is constant, the power used or consumed by the various hydraulic systems of the vehicle may change based on operator commands or environmental conditions. For example, a vehicle will consume more power when travelling at a faster speed, or may impart more energy to the surface being compacted when the surface is wet.

To control the power supplied to the various systems and actuators of the vehicle, the flow rate of hydraulic fluid supplied to the various systems of the vehicle is modulated. This modulation may be accomplished, for example, through control of the displacement of the pump or selective routing of fluid to the various motors and actuators of the vehicle. However, most vehicles operating under most conditions do not entirely consume the power generated by their engines. As is often the case, an appreciable percentage of the power generated by the engine is unused and wasted. This mode of operation causes reduced fuel economy and increased noise during operation.

SUMMARY

The disclosure describes, in one aspect, a method for managing power in a hydrostatically driven vehicle. The vehicle may include an engine operating at least one variable displacement pump connected to a motor. The motor receives a flow of compressed fluid at a pressure. A first sensor is arranged to measure the displacement of the pump and a second sensor measures the pressure of the compressed fluid. The first and second sensors relay their measurements to an electronic controller, which calculates the power consumption of the vehicle based on the pressure of the compressed fluid and the displacement of the pump, for a given engine speed. The controller further calculates the power output of the engine based on at least one engine operating parameter. The controller provides an output signal to cause adjustment of the power output of the engine based on a difference between the calculated power consumption and the power output.

In another aspect, the disclosure describes a hydrostatically operated compactor vehicle having a variable displacement implement pump fluidly connected to an implement motor. Additionally, a variable displacement propel pump is fluidly connected to a propel motor. The implement pump and the propel pump each operate at a respective displacement setting controllable by a respective control input by the operator. The compactor vehicle further includes an engine operating at an engine speed and fueling. An implement supply conduit fluidly connects the implement pump with the implement motor, and an implement pressure sensor is disposed to measure pressure of fluid present in the implement supply conduit. The implement pressure sensor yields an implement pressure signal indicative of the pressure of fluid present in the implement supply conduit, which is relayed to an electronic controller. The electronic controller operates to calculate an implement power consumption based on the implement pressure signal and the respective displacement setting of the implement pump, to calculate the power output of the engine based on the engine speed and fueling, and to generate a power difference signal based upon the difference between the implement power consumption and the power output of the engine. Thereafter, the electronic controller provides an output signal to cause adjustment of at least one operating parameter of the engine based on the power difference such that excess or unused power produced by the engine is reduced.

BRIEF DESCRIPTION OF THE DRAWINGS

FIG. 6 is a flowchart for a method of managing power in a hydrostatically operated vehicle in accordance with the disclosure.

DETAILED DESCRIPTION

This disclosure relates to methods and processes for optimizing the operation of hydrostatically driven vehicles to reduce fuel consumption and noise while increasing the service life and maintenance intervals. A pressure of the hydraulic system is sensed and supplied to an electronic controller. The electronic controller executes according to an optimization algorithm to cause adjustment of various engine and hydraulic system parameters. In this way, the engine can operate in a more efficient state while providing adequate power to meet vehicle demands. For example, the engine can operate at a lower engine speed and torque output when the demand of the vehicle is less than maximum. More specifically, when the controller determines that the power output of the engine exceeds the power consumption of the system, the controller can provide appropriate output signals to adjust the operating condition of the engine to reduce the power output of the engine and achieve improved fuel economy.

Figure 1:
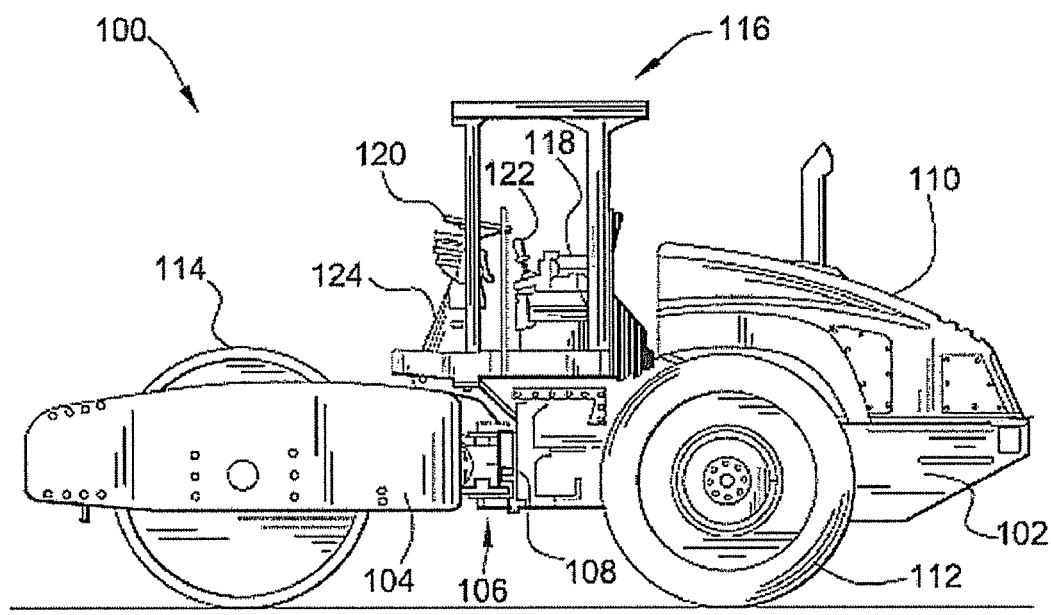
FIG. 1 is an outline view of one example of a hydrostatically driven vehicle in accordance with the disclosure.

An outline view of one example of a hydrostatically driven vehicle 100 is shown in FIG. 1. The vehicle 100 is a soil compactor vehicle that is used for illustration purposes only. As will be appreciated, this disclosure applies to any application of a hydrostatically operated vehicle using hydraulic systems for propulsion and implement operation. Examples of other types of vehicles using hydraulic systems include vehicles used for a variety of tasks, including, for example, loading, compacting, lifting, brushing, and so forth. As can be appreciated, vehicles using hydraulic powered propulsion arrangements may be used, for example, in the construction, mining, agricultural industries, and so forth.

In the exemplary vehicle 100 presented, the vehicle 100 includes an engine frame portion 102 and a non-engine frame portion 104. The engine frame portion 102 and the non-engine frame portion 104 are connected by an articulated joint 106 that includes a hinge 108, which allows the vehicle 100 to steer during operation. The engine frame portion 102 includes an engine 110 and a set of wheels 112 (only one wheel is visible). The engine 110 can be an internal combustion engine, for example, a compression ignition engine, but in general, the engine 110 can be any prime mover that provides power to various systems of the vehicle.

The non-engine frame portion 104 accommodates a drum 114 rotating about a centerline thereof while the vehicle 100 is in motion. The drum 114, which may include an internal vibrator mechanism (shown in FIG. 3 below), acts to compact the terrain beneath the vehicle 100. The vehicle 100 is typically operated by an operator occupying a cab 116. The cab 116 may include a seat 118, a steering mechanism 120, a speed-throttle or control lever 122, and a console 124. An operator occupying the cab 116 can control the various functions and motion of the vehicle 100 by, for example, using the steering mechanism 120 to set a direction of travel for the vehicle 100 or using the control lever 122 to set the travel speed of the vehicle. As can be appreciated, the representations of the various control mechanisms presented herein are generic and are intended to encompass all possible mechanisms or devices used to convey an operator's commands to a vehicle.

Figure 2:
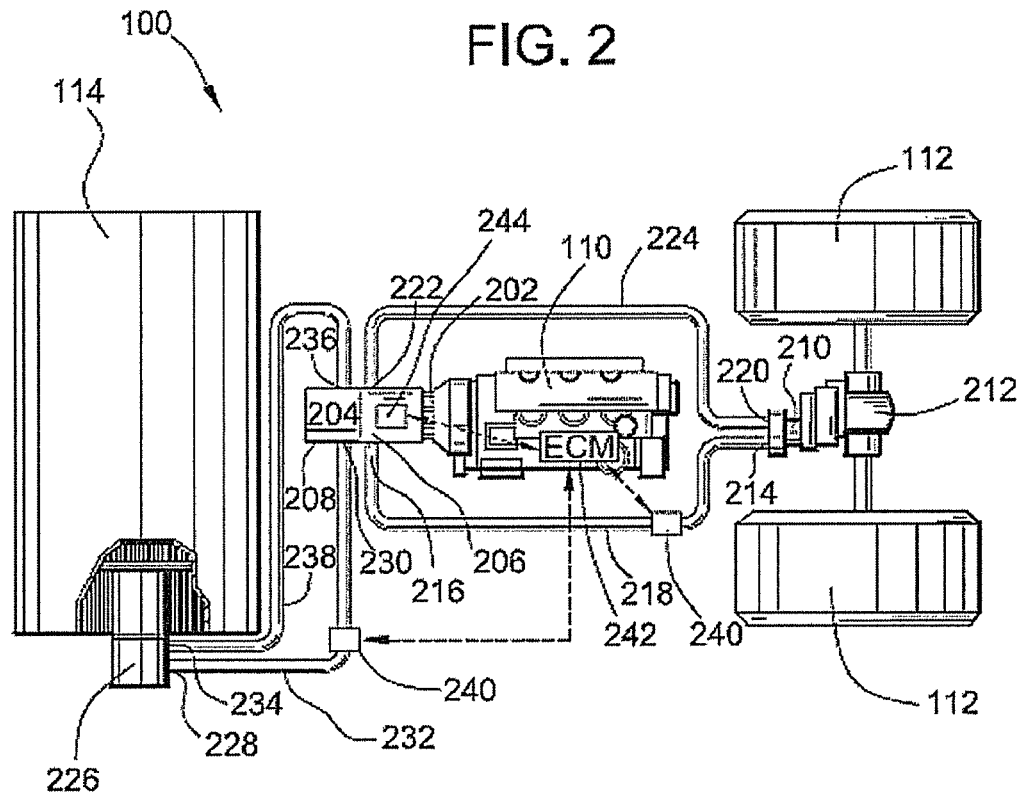
FIG. 2 is a block diagram of various components and systems of the vehicle shown in FIG. 1.

FIG. 2 is a block diagram of various components and systems of the vehicle 100. The engine 110 may be connected via a transmission 202 to two variable displacement pumps, shown generally as 204. A first variable displacement pump 206 may be connected to a second variable displacement pump 208 along their respective input drive shafts (not shown). The two pumps 204 are connected to the transmission 202 such that both pumps 204 are driven together by the engine 110. As can be appreciated, a single pump may be used in place of the two pumps 204 or, alternatively, more than two pumps may be used in tandem or in any other appropriate arrangement. An additional pump driving an implement (not shown here) may also be used.

The first variable displacement pump 206 may be connected to a first propel motor 210. The propel motor 210 may be a hydrostatic drive motor operating to turn a differential 212 that drives the wheels 112. The first propel motor 210 has a fluid input 214 connected to a fluid output 216 of the first pump 206 via a rear propel circuit fluid supply line 218. A fluid output or return 220 of the first propel motor 210 is connected to a fluid return port 222 of the first pump 206 via a rear propel circuit fluid return line 224. The fluid return line 224 may be connected directly to an appropriate port of the first pump 206 or may, alternatively, be connected directly to a fluid reservoir (not shown) that stores and supplies the first pump 206 with fluid. In a similar fashion, the second pump 208 may be connected to a drum propel motor 226. The propel motor 226 may operate to turn the drum 114 and have a fluid input 228 connected to a fluid output 230 of the second pump 208 via a front propel circuit fluid supply line 232. Similarly, a fluid output or return 234 of the second propel pump 208 is connected to a fluid return port 236 of the second pump 208 via a front propel circuit fluid return line 238.

Pressure sensors 240 are connected, at least one each, onto the front and rear fluid supply lines 218 and 232. As can be appreciated, more than one sensor 240 can be connected onto each line or, alternatively, one sensor may be used on one of the supply lines 218 and 232 but not the other. In the exemplary embodiment shown, two sensors 240 are arranged to individually sense the pressure of fluid passing through each of the rear fluid supply line 218 and the front fluid supply line 232. Each of the sensors 240 is connected, and provides pressure sensing signals, to an electronic control module (ECM) 242. The ECM 242 can be mounted onto any location on the vehicle or engine, and may be connected to the sensors and other components of the vehicle 100 and/or the engine 110 in any known fashion. For example, the ECM 242 may be connected via wires carrying a voltage or current that is proportional to the pressure sensed by the sensors 240, or wires and other conduits that carry digital information within a closed area network (CAN) link between the ECM 242 and the sensors 240. The ECM 242 can further be connected to a displacement sensor 244 that measures the displacement of the first pump 206, or the second pump 208, or both pumps simultaneously. A single displacement sensor 244 is shown for the sake of simplicity, but more than one sensor(s) may be used to sense a displacement of one or both pumps 206 and 208. In any event, the displacement sensor 244 operates to provide a displacement sensing signal to the ECM 242. It can be appreciated that an alternate embodiment may include a pump or pump having a fixed displacement, coupled to propel motors having variable displacements.

Figure 3:
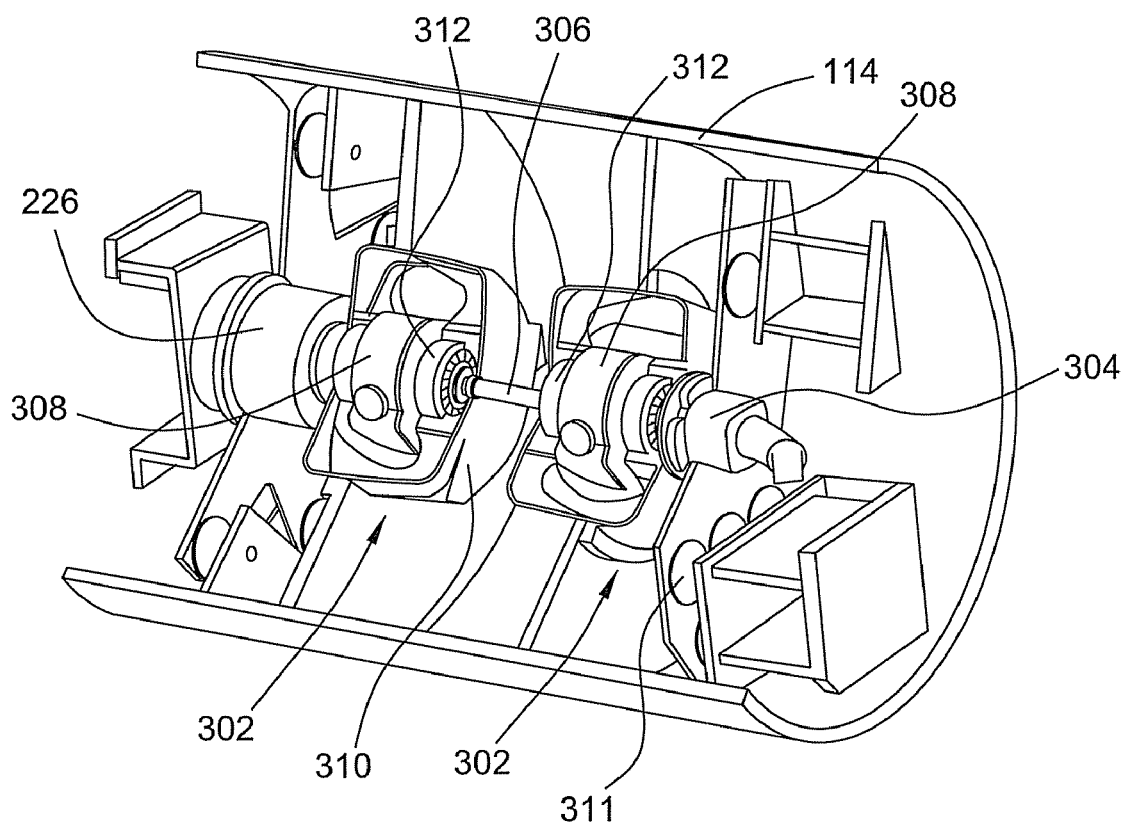
FIG. 3 is a breakaway view of a compactor drum including vibrators as one example of an implement in accordance with the disclosure.

A partial breakaway view of the drum 114 containing two vibrator arrangements 302 is shown in FIG. 3. The drum propel motor 226 is connected to the drum 114. The drum 114 also includes a vibrator motor 304 having an output shaft 306 extending centrally along the drum 114. Each vibrator arrangement 302 includes an eccentric weight 308 enclosed in a respective two-piece housing 310 connected to the drum 114. During operation, the vibrator motor 304 rotates the output shaft 306, which in turn rotates the eccentric weights 308 that are rigidly connected thereto to cause a vibration of the drum 114. A plurality of iso-mounts 311 protect the propel motor 226 and the vibrator motor 304 from excessive vibration during service. A set of bearings 312 connected on either side of each vibrator arrangement 302 transfer the vibration caused by each rotating eccentric weight 308 to the drum 114.

Figure 4:
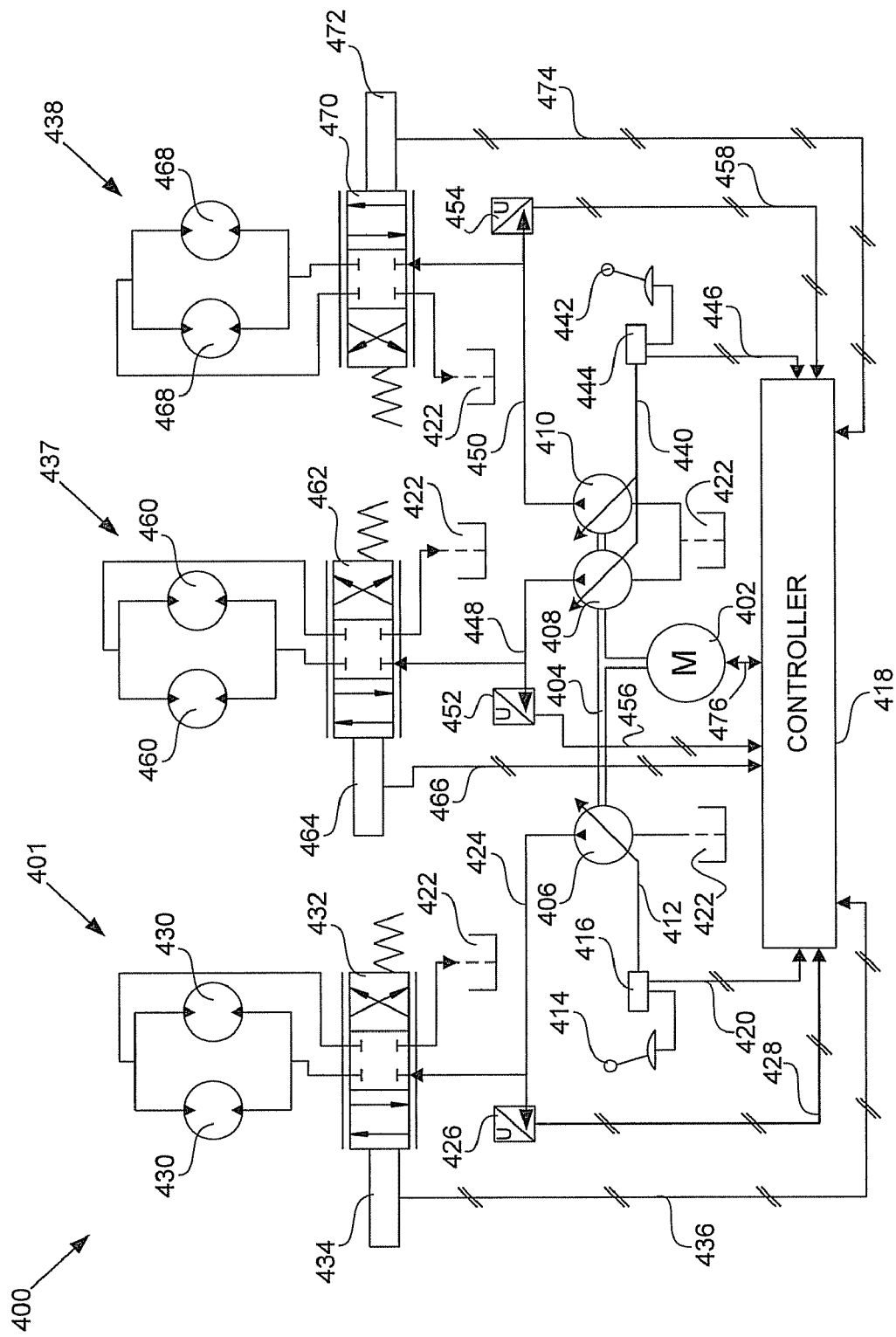
FIG. 4 is a circuit schematic for a hydraulic system in accordance with the disclosure.

A simplified schematic for a hydraulic circuit 400 that is integrated with the vehicle 100 is shown in FIG. 4. The hydraulic circuit 400 may include other systems and/or components that are not shown in FIG. 4 for the sake of clarity. The hydraulic circuit 400 includes components and actuators responsible for propelling the vehicle and operating a work implement. As can be appreciated, the features and component arrangements shown are for illustration and should not be construed as exclusive of other, equivalent arrangements known in the art.

In the illustration of FIG. 4, the hydraulic circuit 400 is shown to include an implement portion or implement circuit

401. An engine 402 connected via a mechanical linkage 404 to an implement pump 406 and to a first and second propel pumps, denoted as 408 and 410 respectively. The implement pump 406 is shown as a variable displacement pump having a control lever 412 operating to adjust the displacement of the implement pump 406 in response to a control input 414. The control input 414 may be controlled or adjusted by an operator during operation of the vehicle 100, and act to set a displacement setting for the implement pump 406. An implement control position sensor 416 may encode the displacement of the control lever 412, and relay information indicative of the displacement of the implement pump 406 to an electronic controller 418 via an implement pump-displacement communication line 420.

The implement pump 406 is fluidly connected to a drain or reservoir 422 and arranged to draw a flow of fluid from the reservoir 422. Fluid is compressed in the implement pump 406 by work input to the implement pump 406 from the engine 402, and a flow of compressed fluid is routed to an implement supply conduit 424. An implement circuit pressure sensor 426 is fluidly connected to the implement supply conduit 424 and arranged to measure the pressure of the compressed fluid in the implement supply conduit 424. The implement circuit pressure sensor 426 is arranged to generate an implement circuit pressure signal indicative of the pressure measured, and relay the signal to the electronic controller 418 via an implement pressure line 428.

The flow of pressurized fluid in the implement supply conduit 424 is used to operate a set of implement motors 430. The implement motors 430 can selectively and bi-directionally receive fluid from the implement supply conduit 424 via an implement 4-port 3-position (4-3) valve 432 that is electronically actuated and that can selectively port either side of the implement motors 430 with either the implement supply conduit 424 or the reservoir 422. Operation of the implement 4-3 valve 432 is controlled by an implement valve actuator 434 connected to the electronic controller 418 via an implement control line 436.

The hydraulic circuit 400 also includes a front axle propel circuit 437 and a rear axle propel circuit 438. In the exemplary vehicle 100 presented, the front axle propel circuit 437 may include the drive mechanism for the drum 114, while the rear axle propel circuit 438 may include the drive mechanism for the wheels 112. Each of the front and rear propel circuits 437 and 438 are arranged in a similar fashion to the implement circuit 401 for the sake of simplicity of illustration, but it can be appreciated that other configurations are possible.

The first and second propel pumps 408 and 410 are variable displacement pumps that are controlled by a common control lever 440 operating to adjust the displacement of both pumps 408 and 410 simultaneously in response to a propel control input 442. The propel control input 442 may be adjusted by an operator during operation of the vehicle 100 to set a travel speed for the vehicle 100. A propel control position sensor 444 may encode the displacement of the common control lever 440, and relay information indicative of the displacement of the first propel pump 408 and the second propel pump 410 to the electronic controller 418 via a propel pump-displacement communication line 446.

The first and second propel pumps 408 and 410 are each fluidly connected to the reservoir 422 and arranged to route a flow of compressed fluid to, respectively, a first and second propel supply conduits 448 and 450. A front axle propel circuit pressure sensor 452 is fluidly connected to the first propel supply conduit 448 and arranged to measure the pressure of the compressed fluid in the first propel supply conduit 448. Similarly, a rear axle propel circuit pressure sensor 454 is fluidly connected to the second propel supply conduit 450 and arranged to measure the pressure of the compressed fluid in the second propel supply conduit 450. The front and rear axle propel circuit pressure sensors 452 and 454 are arranged to generate signals indicative of the respective pressure measured, and relay the signals to the electronic controller 418 via, respectively, a front propel pressure line 456 and a rear propel pressure line 458.

The respective flows of pressurized fluid in the first and second propel supply conduits 448 and 450 are used to move hydraulic motors that propel the vehicle along. More specifically, the front axle propel circuit 437 includes one or more (two shown) front propel motors 460. The front propel motors 460 may be, for example, the propel motor 226 shown in FIG. 2 and FIG. 3 connected to the drum 114. The front propel motors 460 can selectively and bi-directionally receive fluid from the first propel supply conduit 448 via a first propel 4-port 3-position (4-3) valve 462 that is electronically actuated and that can selectively port either side of the first propel motors 460 with either the first propel supply conduit 448 or the reservoir 422. Operation of the first propel 4-3 valve 462 is controlled by a first propel valve actuator 464 connected to the electronic controller 418 via a first propel control line 466.

In a similar fashion, the rear axle propel circuit 438 includes one or more (two shown) rear propel motors 468. The rear propel motors 468 may be, for example, the first propel motor 210 shown in FIG. 2 connected to the differential 212. The rear propel motors 468 can selectively and bi-directionally receive fluid from the second propel supply conduit 450 via a second propel 4-port 3-position (4-3) valve 470 that is electronically actuated and that can selectively port either side of the second propel motors 468 with either the second propel supply conduit 450 or the reservoir 422. Operation of the second propel 4-3 valve 470 is controlled by a second propel valve actuator 472 connected to the electronic controller 418 via a second propel control line 474.

During operation, the engine 402 operates to provide power to each of the implement pump 406 and the first and second propel pumps 408 and 410 via the mechanical linkage 404. A transmission or any other power transfer devices may be part of the mechanical linkage 404. The power input to each pump 406, 408, and 410 is used by the implement motors 430, the front propel motors 460, and/or the rear propel motors 468 that consume the pressurized fluid flowing into, respectively, each supply conduit 424, 448, and 450. As can be appreciated, the total power consumption of the system depends on the aggregate power consumed by each of the motors 430, 460, and 468. Given that the power consumption of each motor 430, 460, and 468 is selectable by the operator based on the needs of the vehicle during operation, and also, given that the engine 402 operates in a continuous fashion outputting a constant power output, it is often the case that an appreciable percentage of the power produced by the engine 402 is wasted.

To avoid the waste of power generated by the engine 402 under some operating conditions, the controller 418 is arranged to operate a power management system that is capable of modulating the power output of the engine 402 such that power demands of the vehicle are met while a minimum amount of power is wasted. The controller 418 is arranged to receive pressure information of fluid within each supply conduit 424, 448, and 450 as indicators of power consumption. Moreover, the controller 418 is connected to the engine 402 via a multichannel communication line 476 that is arranged to both send commands to the engine 402 affecting its operation, for example, throttle or fuel commands, as well as receive information from the engine 402 relative to operating parameters of the engine 402, for example, oil temperature, coolant temperature, engine speed, and so forth.

Figure 5:
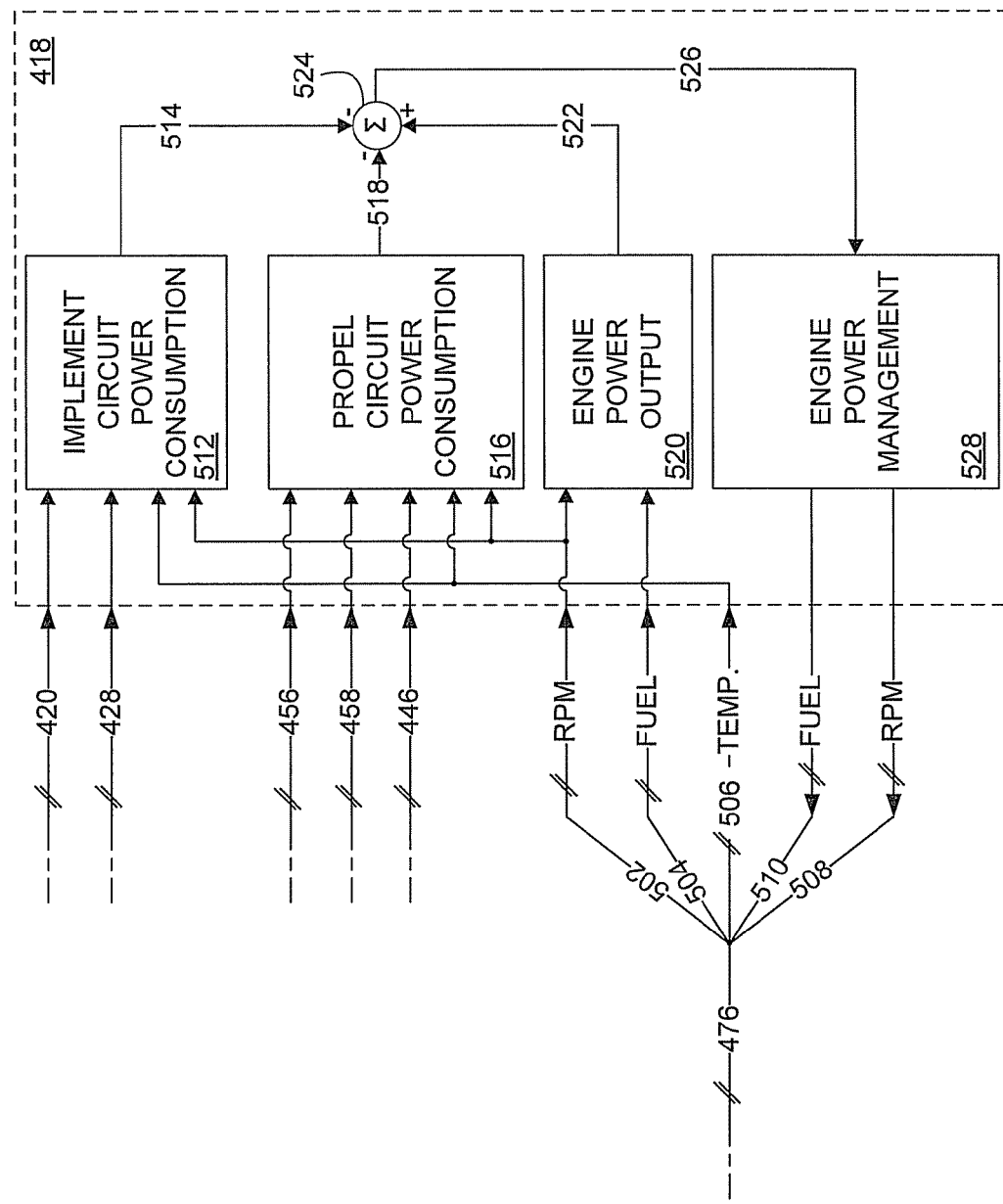
FIG. 5 is a block diagram for the operation of an electronic controller in accordance with the disclosure.

A block diagram for a method of operating the controller 418 is shown in FIG. 5. As described above, the controller 418 is configured to receive information indicative of the displacement of the implement pump 406 via the implement pump-displacement communication line 420, and information about the pressure of the implement circuit 401 via the implement pressure line 428. Similarly, the controller 418 receives information indicative of the displacement of the propel pumps via the propel-pump displacement communication line 446, and information about the pressure of the front and rear propel circuits 437 and 438 via, respectively, the front and rear propel pressure lines 456 and 458. Finally, as pertinent to this discussion, the controller 418 communicates with various sensors and actuators of the engine 402 via the multichannel communication line 476.

The information exchanged between the controller 418 and various components and systems of the engine 402 includes indications of the engine speed (RPM) via an engine speed input 502, a fueling per stroke via fueling input 504, the temperature of the hydraulic fluid in the reservoir 422 via temperature input 506, a fueling command to the engine via an engine speed command line 508, and, optionally, a fueling per stoke command line 510. As can be appreciated, the engine 402 may include a separate controller arranged to report and control values indicative of the fueling and speed of the engine 402 during operation. In such a case, some of the information exchanged between the controller 418 and the engine 402 may be in the form of analog voltage or a digital signal communicated via a closed area network (CAN) link.

The controller 418 may include an implement circuit power consumption calculation block 512 adapted to receive information indicative of the pump displacement, pressure, and temperature of fluid in the implement circuit 401. The implement circuit power consumption calculation block 512 may use these parameters to calculate the amount of power consumed or used by the implement circuit 401 at any given time during operation. The implement power consumption 514 resulting front the calculation may be a digital value having units of power, for example, horsepower or Watts, representing the power consumed by the implement, for example, the vibrators, in real time. It can be appreciated that the implement power consumption 514 may change depending on the settings of the operator as well as on conditions of the surface being compacted.

In a similar fashion, a propel circuit power consumption calculation block 516 receives information indicative of the propel pump displacement, pressure, and temperature of fluid in each of the front and rear propel circuits 437 and 438. The propel circuit power consumption calculation block 516 uses these, and potentially other, parameters to calculate the amount of power consumed or used by the front and rear propel circuits 437 and 438 at real time during motion of the vehicle. The result of the calculation is a propel power consumption 518 value having units of power, for example, horsepower or Watts, that represent the power consumed to move the vehicle.

An engine power output calculation block 520 is configured to receive the current engine speed and fueling command of the engine via, respectively, the engine speed input 502 and the fueling input 504. The engine power output calculation block 520 may be arranged to calculate, in real time, the power output 522 of the engine 402. The power output 522 of the engine may be adjusted for known losses of the system, for example, due to friction or losses in a transmission, or may alternatively also include other parameters. For instance, vehicles having a torque converter or a torque calculator as part of their transmissions may use torque parameters in the calculation of the power output 522.

The implement power consumption 514, the propel power consumption 518, and any other power consumption of the system may be subtracted from the power output 522 at a summing block 524 to yield a power difference 526. The power difference 526 may be positive or negative depending on whether the engine is producing enough power to meet the demands of the system. When efficiency is optimum, the power difference should be slightly more or equal to zero. To help optimize the efficiency of the system, the power difference 526 may be used to adjust the power output of the engine. As can be appreciated, there are other known methods for calculating the power consumption of the various systems on the vehicle. One example of a method of calculating the energy imparted onto a surface by a compaction vehicle can be seen in U.S. Pat. No. 6,973,821 (the '821 patent), issued on Dec. 13, 2005 to Corcoran, which is incorporated by reference herein in its entirety. The '821 patent discloses generating compaction quality assurance data using on-board generates compaction quality data. The quality control compaction data is based upon quantifying the sinkage deformation interaction between the compactor and the base material. This interaction might include monitoring an amount of energy consumes when the compactor moves over the base material.

The power difference 526 may be used to control the speed and fueling of the engine, which are two parameters that can directly affect the power output of the engine. In the embodiment presented, the power difference 526 is input to an engine power management function 528 that operates to adjust commands for engine speed and fueling or load for the engine's operation via, respectively, the engine speed command line 508 and the fueling per stoke command line 510. In this fashion, the controller 418 can ensure that the engine can reduce its power output when the demand of the system is low, thus improving the overall efficiency and fuel economy of the vehicle and, accordingly, increase the power output when demand increases.

A flowchart for a method of managing the power output of an engine associated with a hydrostatically operated vehicle is shown in FIG. 6. The vehicle may include an implement operation circuit that includes, for example, one or more vibrators. The vehicle may also include one or more propel motors operating to rotate a wheel or drum of the vehicle and propel the vehicle along a base surface. The pressure and pump displacement or flow rate of fluid within the implement circuit is measured at 601 and relayed to an electronic controller at 602. In a similar fashion, the pressure and flow rate of fluid in the propel circuit is measured at 603 and relayed to the electronic controller at 604. The measurements relative to the implement circuit are used to calculate a power consumption of the implement circuit, in real time, at 606. Similarly, measurements relative to the propel circuit are used to calculate a power consumption of the propel circuit, also in real time, at 608.

Concurrently, one or more engine operating parameters are used to calculate the power output of the engine at 610. The difference between the power output of the engine from the power consumed by the implement and propel circuits is calculated at 612. The power output of the engine is adjusted by changing at least one operating parameter of the engine, for example, engine speed or fueling, at 614 based on the difference calculated at 612. The adjusted power output of the engine may advantageously be equal to or slightly higher than the total power consumption of the vehicle such that the efficiency and fuel economy of the vehicle are improved.

Industrial Applicability

The present disclosure is applicable to the efficient operation of hydrostatically operated vehicles or vehicles using pressurized hydraulic fluid for motion and operation of implements associated therewith. One example of such a vehicle as presented herein is the soil compactor shown in FIG. 1. This vehicle uses pressurized hydraulic fluid to move the vehicle along a base surface, as well as operate one or more vibrators that are integrated with the drum. The soil compactor has an engine generating power that is used to operate the various systems on the vehicle. In accordance with the present disclosure, control of engine operation can advantageously depend on the power demands of the vehicle, thus allowing for economical operation when the power demands are low.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

All methods described herein can be performed in any suitable order unless otherwise indicated herein or otherwise clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for managing power in a hydrostatically driven vehicle, the vehicle including an engine operating at least one variable displacement pump, at least one implement motor, and at least one propel motor, each receiving a flow of compressed fluid at a pressure, a first sensor disposed to measure the displacement of the at least one variable displacement pump and to provide a first sensing signal, a second sensor disposed to measure the pressure of the compressed fluid and to provide a second sensing signal, and an electronic controller disposed to receive the first sensing signal, the second sensing signal, and to monitor at least one operating parameter of the engine, the controller further disposed to provide an output signal to control the at least one operating parameter of the engine, the method comprising:

calculating a power consumption of the vehicle by the electronic controller based on the pressure of the compressed fluid and the displacement of the variable displacement pump;

calculating a power output of the engine in the electronic controller based on the at least one engine operating parameter monitored by the controller;

subtracting the power consumption of the vehicle from the power output of the engine to provide a power difference; and using the power difference as a primary control parameter to optimize an efficiency of the vehicle by adjusting the output signal such that the power output of the engine is adjusted to minimize the power difference.

2. The method of claim 1, wherein the at least one variable displacement pump includes an implement propel pump operating the implement motor and a propel pump operating the propel motor, and wherein calculating the power consumption includes calculating the power consumption of the implement motor and the power consumption of the propel motor.

3. The method of claim 1, wherein the at least one operating parameter used when calculating the power output of the engine includes at least one of an engine speed and an engine fueling command.

4. The method of claim 1, further including subtracting the power consumption from the power output to yield a power difference, and wherein adjusting the power output signal is based on the power difference.

5. The method of claim 1, wherein the implement motor receives a first flow of compressed fluid via an implement supply conduit, wherein the propel motor receives a second flow of compressed fluid via a propel supply conduit, wherein a first additional sensor is disposed to measure the pressure of fluid in the implement supply conduit, wherein a second additional sensor is disposed to measure the pressure of fluid in the propel supply conduit, and wherein calculating the power consumption of the vehicle includes a first calculation of power consumed based on information from the first additional sensor and a second calculation of power consumed based on information from the second additional sensor.

6. A hydrostatically operated compactor vehicle, the compactor vehicle including a variable displacement implement pump fluidly connected to an implement motor, a variable displacement first propel pump fluidly connected to a first propel motor, the implement pump and first propel pump operating at a respective displacement setting controllable by a respective control lever, the compactor vehicle further including an engine operating at an engine speed and fueling, the engine operatively associated with the implement pump and the first propel pump, the power management system comprising:

an implement supply conduit fluidly connecting the implement pump with the implement motor;

an implement pressure sensor disposed to measure pressure of fluid present in the implement supply conduit, the implement pressure sensor yielding an implement pressure signal indicative of the pressure of fluid present in the implement supply conduit;

an electronic controller disposed to receive the implement pressure signal, the engine speed, and the fueling, the electronic controller disposed to:

calculate an implement power consumption based on the implement pressure signal and the respective displacement setting of the implement pump;

calculate the power output of the engine based on the engine speed and fueling;

subtract the implement power consumption from the power output of the engine to provide a power difference; and use the power difference as a primary control parameter to optimize an efficiency of the compactor vehicle by changing at least one operating parameter of the engine such that the power output of the engine is adjusted to minimize the power difference.

7. The hydrostatically operated compactor vehicle of claim 6, further including:

a first propel supply conduit fluidly connecting the first propel pump with the first propel motor;

a first propel pressure sensor disposed to measure pressure of fluid present in the first propel supply conduit, the first propel pressure sensor yielding a first propel pressure signal indicative of the pressure of fluid present in the first propel supply conduit;

wherein the electronic controller is further disposed to receive the first propel pressure signal, the electronic controller further operating to calculate a first propel power consumption based on the first propel pressure signal and the respective displacement setting of the first propel pump; and wherein the power difference calculation further includes subtracting the first propel power consumption from the power output of the engine.

8. The hydrostatically operated compactor vehicle of claim 6, further including:

a second propel pump fluidly connected to a second propel motor, the engine operatively associated with the second propel pump;

a second propel supply conduit fluidly connecting the second propel pump with the second propel motor;

a second propel pressure sensor disposed to measure pressure of fluid present in the second propel supply conduit, the second propel pressure sensor yielding a second propel pressure signal indicative of the pressure of fluid present in the second propel supply conduit;

wherein the electronic controller is further disposed to receive the second propel pressure signal, the electronic controller further operating to calculate a second propel power consumption based on the second propel pressure signal and the respective displacement setting of the second propel pump; and wherein the power difference calculation further includes subtracting the second propel power consumption from the power output of the engine.

9. The hydrostatically operated compactor vehicle of claim 6, wherein the at least one engine operating parameter changed by the electronic controller based on the power difference is at least one of engine speed and engine fueling per stroke.

10. The hydrostatically operated compactor vehicle of claim 6, wherein the implement motor is a hydraulic motor having an output shaft, and wherein the vehicle further includes at least one eccentric weight operating to vibrate the output shaft when the output shaft is rotating.

11. A method for controlling an engine associated with a vehicle, the engine operating to output engine power and operating at an engine speed, the vehicle including a hydraulic circuit having an implement circuit portion and a propel circuit portion, the implement circuit portion including a variable displacement implement pump operating at an implement pump displacement setting, the propel circuit portion including a variable displacement propel pump operating at a propel pump displacement setting, the method comprising:

measuring an implement circuit pressure;

sensing the implement pump displacement setting;

calculating an implement circuit power consumption based on the implement circuit pressure and the implement pump displacement setting; and using a power difference as a primary control parameter to adjust at least one operating parameter of the engine to optimize an efficiency of the vehicle, the power difference being calculated by subtracting the implement power consumption from the output engine power, wherein the efficiency of the vehicle is at an optimum when the output engine power is adjusted to minimize the power difference.

12. The method of claim 11, further including:

measuring a propel circuit pressure;

sensing the propel pump displacement setting;

calculating a propel circuit power consumption based on the propel circuit pressure and the propel pump displacement setting; and adjusting the at least one operating parameter of the engine based on the difference between the implement circuit power consumption, the propel circuit power consumption, and the output engine power.

13. The method of claim 12, wherein the propel circuit power consumption is further based on the engine speed.

14. The method of claim 11, wherein the implement circuit power consumption is further based on the engine speed.

15. The method of claim 11, wherein the at least one engine operating parameter is engine speed.

16. The method of claim 11, wherein the at least one engine operating parameter is fueling per stroke.

17. The method of claim 11, wherein the vehicle further includes an electronic controller disposed to receive a pressure signal indicative of the implement circuit pressure, and a displacement signal indicative of the implement pump displacement setting.

18. The method of claim 11, wherein the implement circuit power consumption is further based on a temperature of a fluid, the fluid circulating in the hydraulic circuit.

19. The method of claim 11, wherein the vehicle is a soil compactor.

* * * * *